United States Patent [19]

Collins

[11] Patent Number: 4,845,882
[45] Date of Patent: Jul. 11, 1989

[54] REEL SEAT ASSEMBLY

[76] Inventor: Stuart M. Collins, 526 N.E. 190 St., N. Miami Beach, Fla. 33179

[21] Appl. No.: 222,802

[22] Filed: Jul. 22, 1988

[51] Int. Cl.$^4$ ............................................. A01K 87/06
[52] U.S. Cl. ............................................ 43/22; 43/25
[58] Field of Search ............................ 43/22, 18.1, 25; 16/380

[56] References Cited

U.S. PATENT DOCUMENTS

| 1,970,348 | 8/1934 | Turano | 43/22 |
| 1,980,317 | 11/1934 | Clark et al. | 43/22 |
| 2,034,901 | 3/1936 | Harris | 43/22 |
| 2,088,132 | 7/1937 | Domecq | 43/23 |
| 2,104,495 | 1/1938 | O'Brien, Jr. | 43/22 |
| 2,182,468 | 12/1939 | Coxe | 43/22 |
| 2,885,816 | 5/1959 | Cunningham et al. | 43/22 |
| 2,978,736 | 4/1961 | Welker | 16/380 |
| 3,073,055 | 1/1963 | Edwards et al. | 43/23 |
| 4,045,902 | 9/1977 | Ohmura | 43/22 |
| 4,077,150 | 3/1978 | Barnes | 43/22 |
| 4,083,141 | 4/1978 | Shedd et al. | 43/22 |
| 4,403,439 | 9/1983 | Wallace | 43/18.1 |
| 4,637,157 | 1/1987 | Collins | 43/22 |
| 4,688,346 | 8/1987 | Collins | 43/22 |

FOREIGN PATENT DOCUMENTS 2017471 10/1979 United Kingdom .................... 43/22

Primary Examiner—Nicholas P. Godici
Assistant Examiner—William Scott Andes
Attorney, Agent, or Firm—John Cyril Malloy

[57] ABSTRACT

A fishing reel assembly designed for use either on a butt structure for securement directly to a fishing rod and including an elongated body having two holder elements mounted thereon for retaining engagement of a support plate of the fishing reel. One of the holder elements is slidably and rotatably movable along the length of the body and the other holder element is fixedly secured to a leading portion of the body and attached to the outer surface thereof in a manner which resists both rotational or longitudinal displacement through the provision of a positioning structure formed on the body.

6 Claims, 2 Drawing Sheets

REEL SEAT ASSEMBLY

BACKGROUND OF THE INVENTION

1. Field of the Invention

This invention relates to a reel seat assembly which is designed to removably support and retain a fishing reel in an operative position on a fishing or butt structure and wherein the assembly is designed and configured to accommodate bracing elements of the fishing reel if such are required.

2. Description of the Prior Art

Fishing reels known in the prior art vary in size, configuration and structural features depending upon the intended use, type of fishing and size of fish being sought. However, in utilizing fishing reels, almost regardless of their size and shape, each is mounted on some type of fishing equipment, such as directly on a fishing rod or alternately on a butt structure of the type to be fitted in a contained socket of a "fighting chair" or on a "fighting belt" secured to the fisherman. Regardless of the equipment with which the fishing reel is used, it is normally removably supported and retained in a preferred, operable position by means of a support plate secured to the fishing reel being attached to a fishing reel seat.

Fishing reel seats are of course also generally well known in the prior art. Such reel seat assemblies are normally structured to be integrally or fixedly secured to the aforementioned butt structure or in some cases directly mounted on and considered a part of the fishing rod itself. While initially such conventional reel seat assemblies do not appear to differ significantly from one another, there are certain recognized disadvantages with such prior art devices which have not been rectified by attempted design or structural changes.

Such existing problems relate to the construction and/or assembly of such reel seat structures as well as the ability of holder elements thereon to adequately support and maintain the fishing reel in the preferred operative position even under unusual stress conditions.

In addition to the above, it is common practice to use bracing structures extending outwardly from the fishing reel brace into at least partially surrounding and engaging relation with the butt or rod on which the reel is mounted. Such bracing structures are usually prevalent in fishing reels designed for larger, heavier game fish. Previously existing fishing reel structures did not adequately provide for common bracing bands but rather, assumed the placement thereof would be accomplished at any convenient location. This practice in turn lead to significant defacing of the outer surface of the rod or butt structure and in some cases the deterioration of handle portions thereof.

Numerous U.S. Patents as set forth below are representative of existing prior art reel seat assemblies.

Clark et al, 1,980,317 discloses a conventional reel seat structure having front and rear holder elements but absent any positioning means to insure fixed placement of one or both of the holder elements and also being absent any designated portion for the placement of a bracing structure associated with the subject reel. Similarly, Harris, 2,034,901; Domecq, 2,088,132; Edwards et al, 3,073,055; and Ohmura, 4,045,902 all disclose a reel seat assembly with at least one of the holder elements being adjustable and/or selectively positionable along the length of the body of the reel seat so as to be adaptable to the support plates associated with the fishing reel having various dimensions and accordingly wherein the fishing reels have various sizes.

Cunningham et al, 2,885,816; O' Brien, Jr., 2,104,495; and Barnes, 4,077,150 all relate to fishing reel structures substantially designed to be associated with the rod itself and having structural configuration allowing adjustability of the support and placement of the support plate on the fishing reel so as to maintain it in an operative position. All of such known prior art structures are absent any positioning means associated directly with the body of the fishing reel to facilitate an elimination of the possibility of inadvertent displacement of any one of the fixed holder elements and thereby eliminate the possibility of inadvertent displacement of the fishing reel during its operation when unusually large or excessive forces are applied thereto.

Coxe, 2,182,468 is directed towards fishing equipment including a fishing rod and reel combination wherein the fishing reel has specific brace elements extending outwardly from the main body of the reel and cooperatively attached to the rod. The reel seat itself however is basic and conventional in nature and is absent specific structural features which would alleviate certain inherent prior art problems.

Even in view of the above, there is still a need for a fishing reel assembly capable of being designed and structured to removably support and retain a fishing reel in an operative position and maintain such operative position even when excess force is applied thereto. Such a preferred reel seat assembly should be specifically designed and configured to facilitate ease of construction and assembly thereby eliminating certain of the well known problems associated with the production of such reel seat assemblies in the prior art.

SUMMARY OF THE INVENTION

The present invention relates to a reel seat assembly specifically designed and constructed for use in combination with a butt structure of the type disclosed and claimed in U.S. Pat. No. 4,637,157 or alternately, which could be mounted directly on a rod. In either embodiment, the subject reel seat assembly is capable of removably supporting and retaining the support plate of any number of a variety of fishing reels commercially available and known in the prior art. The reel seat assembly of the present invention comprises an elongated body having one end defined by a threaded exterior surface configuration to accommodate locking means preferably in the form of two internally threaded locking nuts which are positionable and secured at any point along the threaded surface and facilitate retaining engagement of one of two holder elements onto the support plate of the fishing reel. This first holder element is dimensioned to be effectively free sliding and rotational movement along the length of the body to the extent that its longitudinal displacement is limited by the position of the locking nuts on the threaded surface. When operatively positioned to engage and support a fishing reel, displacement of this first holder element longitudinally in the opposite direction is limited by its engagement with the support plate of the fishing reel.

A second holder element is fixedly secured in surrounding relation to the outer surface of the body in spaced relation to the exterior threaded surface and more closely adjacent a second end of the body but also in spaced relation therefrom. The existing space defined by the distance on the exterior surface of the body between the outer or leading extremity of the second holder element and the endmost portion of the body itself may define a brace engaging portion for the location and gripping of a leading brace element. The brace element is generally defined by a metal or like material band disposed in partially surrounding relation to a lower outer surface of the brace engaging portion. Accordingly, the longitudinal dimension of the brace engaging portion must be such as to receive and accommodate the width of the leading brace element associated with the fishing reel. By virtue of the position of this bracing portion on the body the use of such a bracing element will not disfigure or damage any portion of the fishing rod or butt structure with which the subject reel assembly may be used.

Another important feature of the present invention is the existence of a positioning means formed on the body and more specifically generally associated integrally with the outer surface thereof in cooperative engagement and relation to the second holder element. The purpose of the positioning means is to resist any inadvertent linear or rotational displacement of the fixedly secured second holder element when excess force is applied thereto. The application of such excess force may be due to its interconnection and support of the fishing reel. More specifically, excess force is frequently placed on the fishing reel, whether or not bracing elements are used therewith, such as when an inordinately large fish is hooked. Frequently, in prior art devices, such excess force is transferred to the holder elements retainingly engaging opposite ends of the support plate of the fishing reel. Displacement of a fixed one or both of the holder elements could result in dislodgement or displacement of the fishing reel from its preferred upright and operative position. This in turn could of course result in losing the fish or damage to the tackle or equipment as well as the fishing reel itself.

Accordingly, the positioning means of the present invention comprises a roughened exterior surface portion preferably having an annular configuration and disposed in underlying relation and frictional engagement with an under portion of the second holder element. The roughened surface portion is preferably knurled and thereby provides a "biting" engagement between this roughened surface portion and the inner surface of the second holder element overlying and engaging this roughened surface portion.

The positioning means further comprises, in combination with the roughened surface, a stop element integrally formed on the exterior surface of the body in inwardly spaced relation from the outer extremity of the second end of the body and in directly abutting, stopping engagement with the leading or outer extremity of the second holder element. This stop element is preferably in the form of an outwardly extending shoulder element structured and configured to have an outer diameter greater than the inner diameter of the second holder element such that inadvertent longitudinal displacement of the second holder element beyond the shoulder is prevented. Such displacement can occur when excess force is placed on the fishing reel, as set forth above.

In a preferred embodiment of the present invention to be described in greater detail hereinafter, the first end including the threaded exterior surface is fixedly connected to either the butt structure or directly to the rod itself, depending upon the particular application desired, and accordingly, the fixed second holder element and second end of the body of the fishing reel assembly is disposed toward the leading end of the rod or butt structure. This facilitates alignment of the aperture of the individual holder elements, especially the fixed element holder, with the eyes of the fishing rod or intended preferred upright orientation of the fishing reel as is well known in the art.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

The same reference numerals refer to the same parts throughout the several views of the drawings.

DETAILED DESCRIPTION OF THE PREFERRED EMBODIMENT

Figure 1:
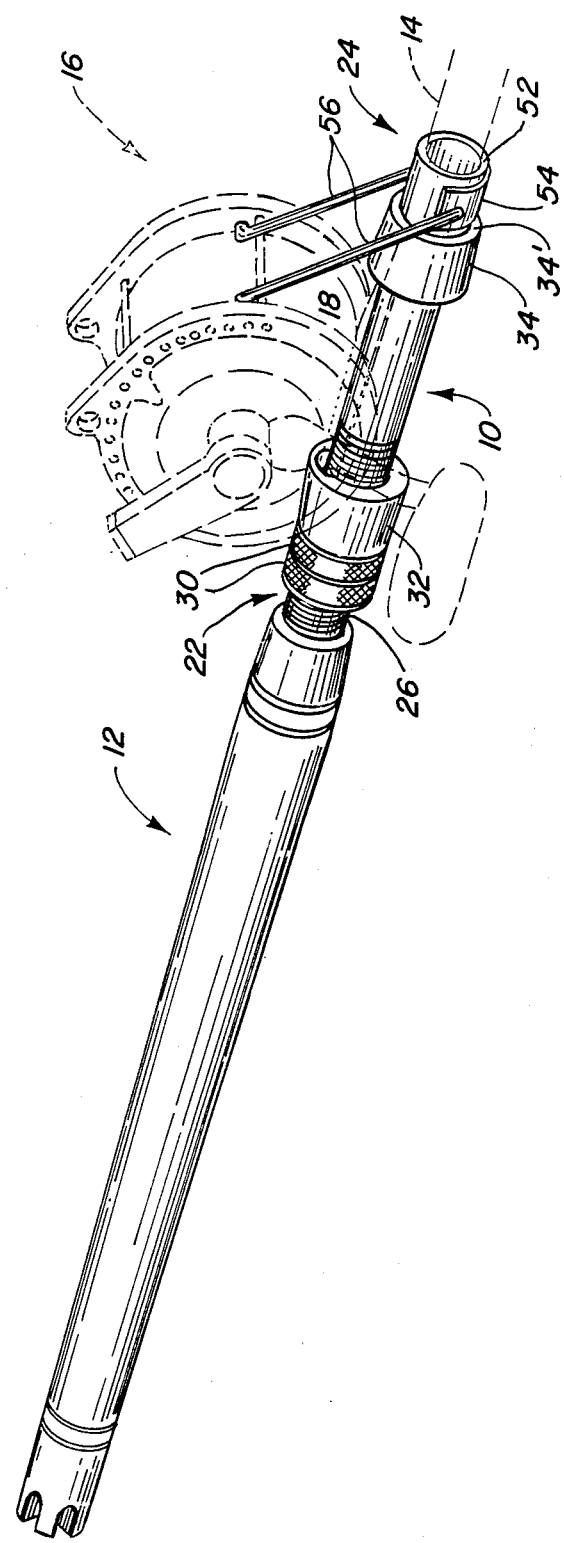
FIG. 1 is a perspective view of a reel seat assembly of the present invention mounted on a butt structure with a reel of any prior art structure or design shown supported and represented in phantom lines thereon.
Figure 2:
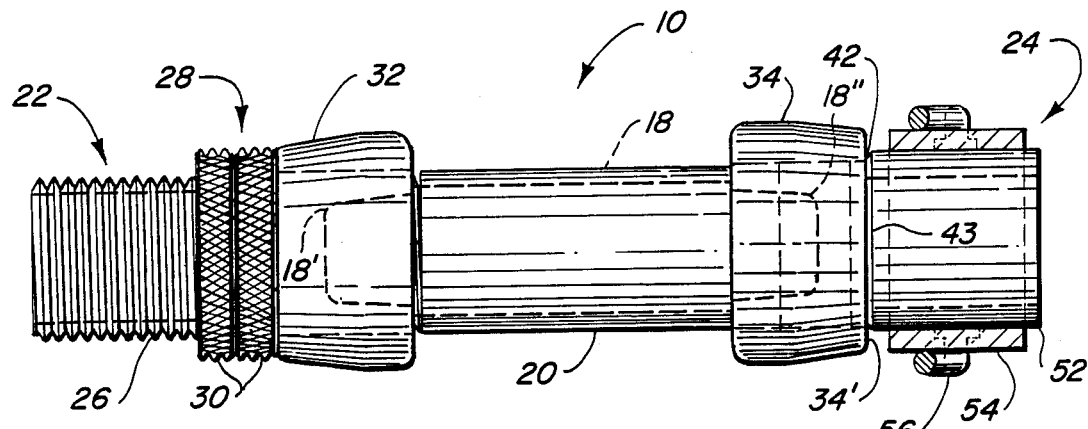
FIG. 2 is a top longitudinal view in partial cross section of the reel seat structure of the present invention.
Figure 3:
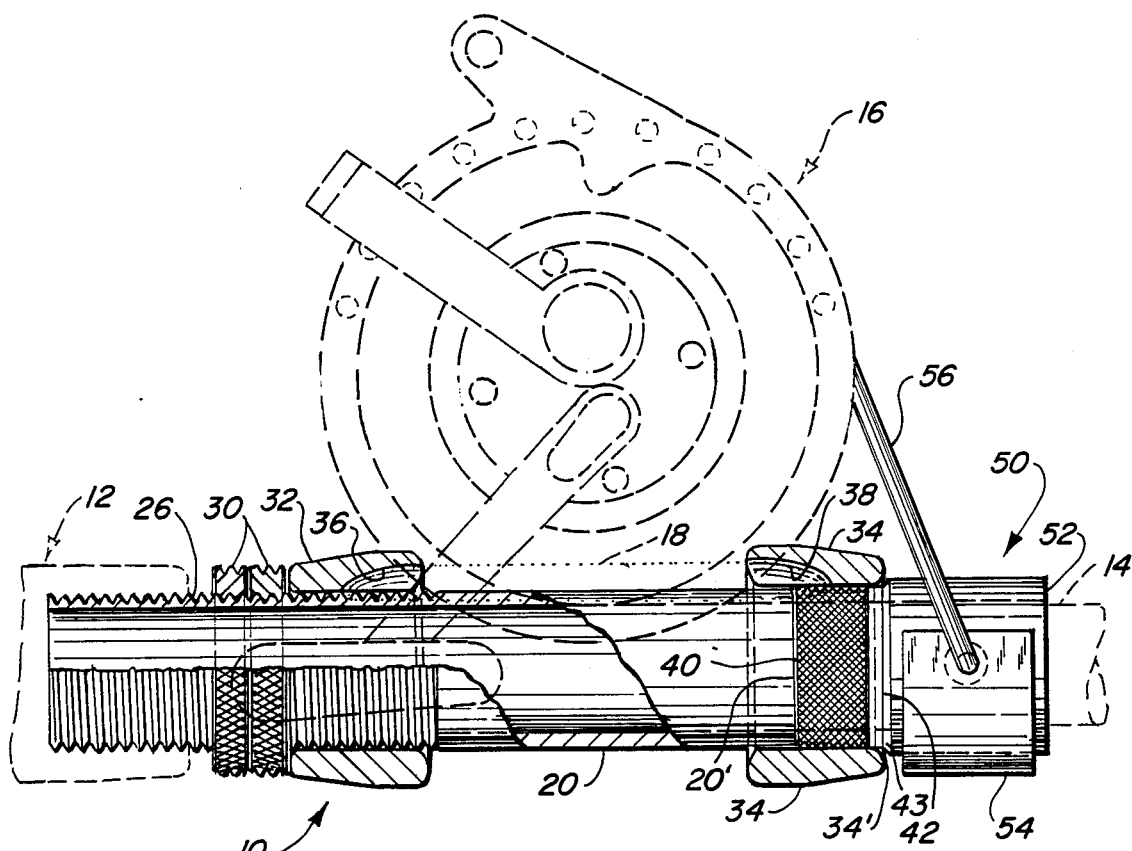
FIG. 3 is a longitudinal side view in partial section of the embodiment of FIG. 2, again with a supported reel structure represented in phantom lines.

As shown in FIGS. 1 through 3, the present invention is directed to a reel seat structure generally indicated as 10 and of the type designed for use in combination with a butt structure 12 commonly known in the industry for the fitting of a blank or rod 14 in a fighting chair, fighting belt, etc. However, it should be emphasized that the structure of the present invention can also be used in combination with a fishing rod absent the butt structure. The reel seat structure 10 is of course designed to operatively mount and support any one of a plurality of fishing reels 16 in the operative position shown in FIGS. 1 and 3 wherein the fishing reel 16 has fixedly secured thereto a support plate 18 removably connected to the reel seat structure 10.

With primary reference to FIGS. 2 and 3, the reel seat assembly 10 of the present invention comprises an elongated body 20 having a first end generally indicated as 22 with a threaded exterior surface configuration and a second end generally indicated as 24. In its operative position for support of a fishing reel 16, the first end 22 may also be considered the trailing end of the reel seat assembly and the second end 24 may be considered the leading end relative to the placement and connection to the fishing rod or blank 14.

The threaded exterior surface configuration as at 26 on the first end 22 provides for mating and threaded engagement with a locking means generally indicated as 28. The locking means preferably comprises at least one but preferably two locking nuts 30 each being internally threaded (see FIG. 3) so as to be selectively positionable along the length of the exterior threaded surface 26 and into abutting engagement with one of two holder elements 32 and 34. The holder elements 32 and 34 are mounted in surrounding relation to the exterior surface of the body 20 as shown clearly in FIGS. 1 through 3.

The first of the two holder elements as at 32 has an annular configuration and an internal diameter greater than the exterior surface configuration of the body 20 and the exterior threaded surface 26 such that the one holder element 32 may freely rotate and slide or move longitudinally along the length of the body and therefore into and out of retaining engagement with one end 18′ of the support plate 18 secured to the fishing reel structure 16. The free movement of the one holder element 32 is important in that the other of the two holder elements as at 34 is fixedly secured in surrounding relation to the exterior surface of the body 20 as shown best in FIGS. 2 and 3. With reference to FIG. 3, each of the first and second holder elements 32 and 34 are in the form of a hood-like structure being annularly configured and having an internal recess as at 36 and 38 respectively. These respective recesses are dimensioned, disposed and configured to receive the opposite ends 18′ and 18″ of the support plate 18 associated with the fishing reel 16.

Since the holder element 34 is fixed relative to the body 20, the leading end 18″ of the support plate is first placed within the recess 38 thereof. Next, the other holder element 32 is rotationally and longitudinally positioned relative to the body such that its accompanying recess 36 is placed in retaining position about the opposite end 18′ of the support plate 18 in the manner clearly shown in FIG. 3. When so positioned, the locking means in the form of the two locking nuts are rotationally positioned until they are in abutting relation with the outer end of the holder element 32 as shown in FIGS. 1, 2 and 3.

An important feature of the present invention is the existence of a positioning means. The positioning means, as best shown in FIG. 3, comprises a roughened, biting surface configuration 40 formed in underlying relation and in frictional engagement with the undersurface of the holder element 34. In a preferred embodiment, the positioning surface 40 may be knurled so as to provide the proper "biting" action to the extent that a firm grip is maintained between the knurled portion 40 and the inner or under surface of the holder 34. By virtue of this position, rotational displacement of the holder element 34 is eliminated or severely restricted. Also in the preferred embodiment, the knurled portion 40 extends continuously about the outer surface 20′ in an underlying relation to the holder element 34 so as to continuously engage the correspondingly positioned mating surface of the holder element 34 along its entire length.

The positioning means (see FIGS. 2 and 3) of the present invention further includes a shoulder element 42 defined by a greater outer diameter of the body 20 beginning substantially at 43 and continuing thereabout. The shoulder 42 therefore has a larger outer diameter than the inner diameter of the holder element 34. The leading extremity of the holder element 34 as at 34′ is therefore positioned in abutting, stopped engagement with the shoulder 42 in order to make coaxial movement beyond the shoulder 42 towards the rod or blank 14 impossible. Therefore, fixed disposition in the operative position shown in FIGS. 2 and 3 of the holder element 34 is basically insured even when excessive force is applied to the reel structure 16, during its operation, which would normally tend to dislodge or displace the intended fixed positioning of the holder element 34.

Another feature of the present invention is a brace engaging portion generally indicated as 50 formed on the body 20 between the shoulder 42 and the leading extremity 52 of the second end 24. This brace engaging portion provides a clear space and outer extension of the body 20 integrally formed thereon and extending longitudinally outward from the holder element 34 a sufficient distance to accommodate a brace band 54 of the type which may be of generally conventional construction and known in the prior art. Typically, the brace band 54 is maintained in place by two brace fingers or the like 56 having their opposite ends attached to the fishing reel structure 16 as clearly shown in FIGS. 1 and 3. Suffice it to say that the brace band 54 and brace fingers 56 as well as their attachment to the fishing reel 16 may of course vary dependent upon the commercial model utilized. However, the existence of a brace engaging portion as at 50 allows for the accommodation of the brace band 54 without the band engaging and possibly damaging the outer surface as well as the structural integrity of the rod 14 or other portions of the rod, blank, or reel seat assembly itself.

Now that the invention has been described,
What is claimed is:

1. A reel seat assembly designed for mounting on fishing equipment such as a butt structure and fishing rod and to be used for removably supporting a fishing reel thereon, said reel seat assembly comprising:
    (a) an elongated body portion having an exterior threaded surface at a first end thereof and a second end being oppositely disposed to said first end,
    (b) a first holder element surrounding said body and having a greater interior dimension than an outer dimension of said body and being movable along the length of said body and said exterior threaded surface thereof,
    (c) a second holder element secured to said body in fixed surrounding engagement with an outer surface thereof substantially adjacent and spaced from said second end of said body,
    (d) locking means being internally threaded and positionable in mating engagement along the length of said exterior threaded surface in abutting engagement with said first holder element for preventing linear movement thereof beyond said locking means,
    (e) said first and second holder elements each being structured and disposed to engage and retain a different opposite end of a support plate of the fishing reel,
    (f) a brace engaging portion formed on said body between said second end of said body and said second holder having a length substantially equal to that of said second holder and being disposed and dimensioned to receive a brace structure of the fishing reel thereon,
    (g) positioning means formed at least in part on said outer surface of said body adjacent said brace engaging portion and formed of an integral one-piece construction with said body, said positioning means comprising, in combination:
        1. a roughened surface portion having a substantially annular configuration integrally formed on said outer surface of said body and in frictional, locking engagement with an under surface portion of said second holder, said roughened surface having a sufficient transverse dimension to extend along at least substantially one-third of said under surface portion of said second holder element, 2. a stop structure defined by a shoulder integrally formed on said body between said second end thereof and said roughened surface portion and including an annular configuration disposed coaxial with said second holder and extending radially outward from said outer surface of said body into abutting engagement with a correspondingly positioned end of said second holder, 3. said second holder element being resistant to both rotational displacement and linear displacement along said outer surface of said body beyond said shoulder, (h) said brace engaging portion extending continuously from said second end of said body to said shoulder.

2. An assembly as in claim 1 wherein said brace engaging portion comprises a common outer diameter along its length, said common outer diameter being equal to an outer diameter of said shoulder.

3. An assembly as in claim 2 wherein said shoulder is contiguously disposed at an innermost end of said brace engaging portion.

4. An assembly as in claim 1 wherein said roughened surface is defined by a knurled configuration along its length.

5. An assembly as in claim 1 wherein said roughened surface portion has a substantially continuous annular configuration and said shoulder has a larger outside diameter than said roughened surface portion and is disposed substantially adjacent thereto.

6. An assembly as in claim 1 wherein said second end and said brace engaging portion are disposed in a leading, forward position relative to placement of the fishing reel on said body, said first end and said exterior threaded surface of said body being disposed in a trailing, rearward position relative to placement of the fishing reel.

* * * * *